Feb. 6, 1934.   G. G. MORENO   1,945,909
FILM GATE
Filed April 18, 1931   2 Sheets-Sheet 1

INVENTOR
GABRIEL GARCIA MORENO
BY
HIS ATTORNEY

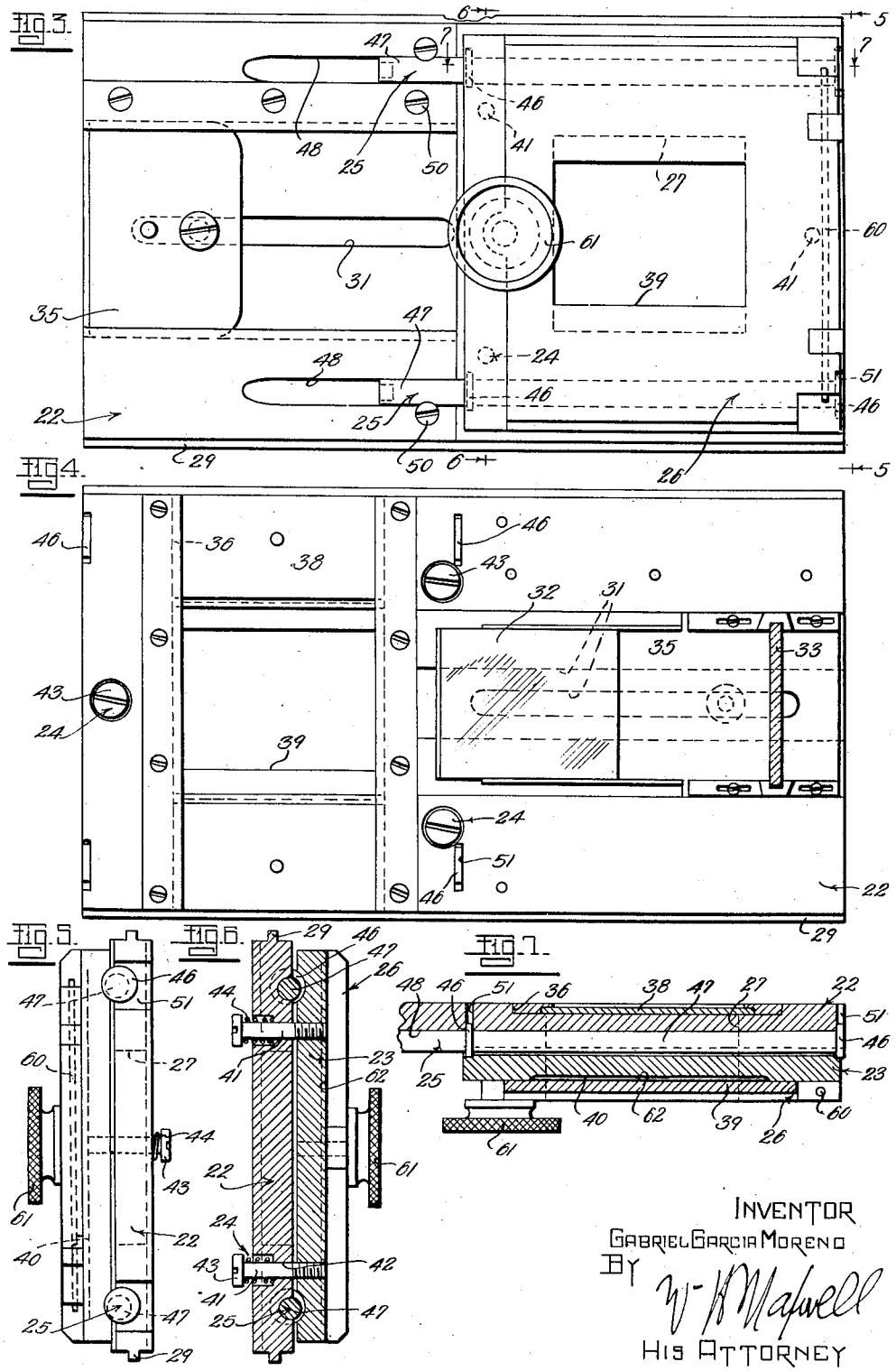

Patented Feb. 6, 1934

1,945,909

UNITED STATES PATENT OFFICE 1,945,909

FILM GATE

Gabriel Garcia Moreno, Los Angeles, Calif., assignor to Moreno-Snyder Cine Corporation, Ltd., Los Angeles, Calif., a corporation of Delaware Application April 18, 1931. Serial No. 531,203

8 Claims. (Cl. 88—17)

This invention has to do with a film gate or film guide for use in motion picture apparatus, and it is a general object of the invention to provide improvements in the construction and mounting of a film guide.

The construction provided by the present invention is applicable, generally, to motion picture apparatus, i. e., it can be use in various types and forms of cameras and projectors. The invention is particularly useful, however, as applied to or for use in connection with motion picture apparatus involving an optical system which does not lend itself to adjustment with reference to the film. As an example of an optical system in this class, I will refer to the optical system and apparatus which is the subject of my co-pending application entitled Motion picture optical system and apparatus, filed April 18, 1931, Serial Number 531,200. It is to be understood, however, that the invention is not to be construed as limited to use in connection with any particular optical system, but is general in its application.

A primary object of the present invention is to provide a film gate in motion picture apparatus having a film guide adjustable longitudinally of the axis of the optical system of the apparatus.

Another object of this invention is to provide a simple, accurate, and practical construction for adjusting the film guide of the present invention.

Another object of the present invention is to provide various improvements in the construction and formation of parts in a film gate, for instance, in features of mounting and assembly with other parts of the apparatus, etc.

Figure 1:
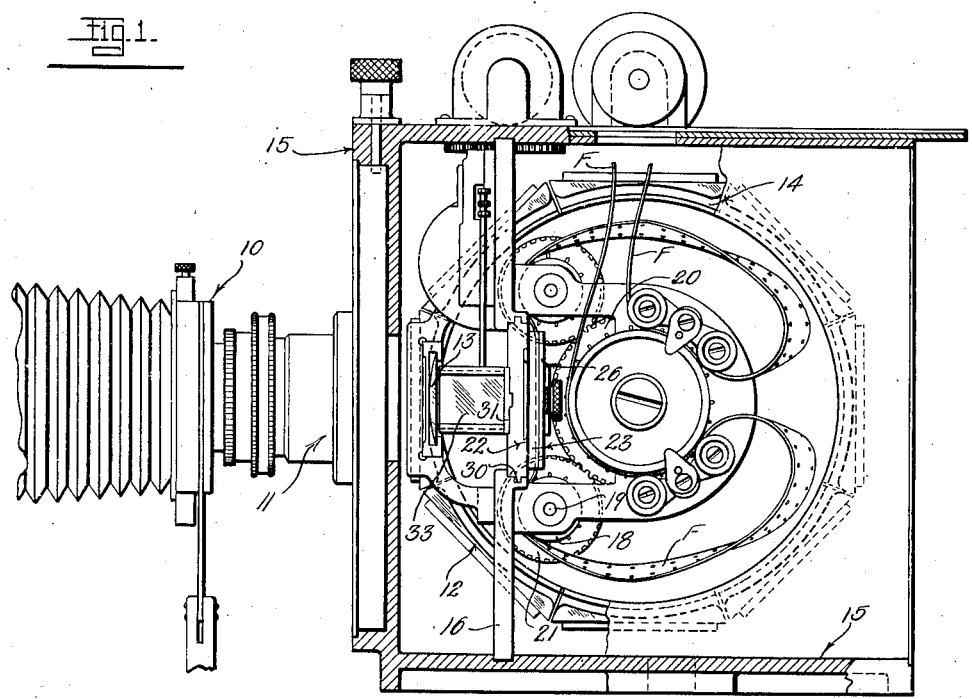
Figure 2:
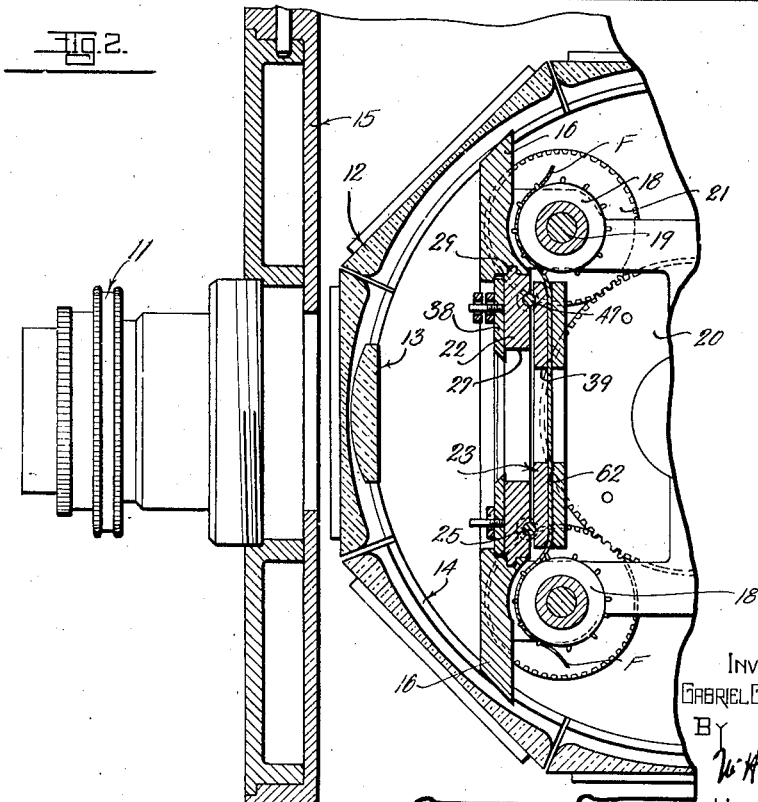

The various objects and features of my invention will be best and more fully understood from the following detailed description of a typical form and application of the invention, throughout which description reference will be had to the accompanying drawings, in which:

Fig. 1 is a side view of a motion picture camera of the type in which the film is operated continuously, being a view showing parts at one side of the camera removed to show the general arrangement of the film gate of the present invention in the camera. Fig. 2 is an enlarged detailed sectional view taken through the camera at the film gate, being a view illustrating, generally, the relationship of the film gate to the optical system of the camera and to the film-operating means of the camera. Fig. 3 is an enlarged rear view of the film gate of the present invention, showing it detached from the other parts of the camera. Fig. 4 is an enlarged front view of the film gate of the present invention, showing it detached from the other parts of the camera. Fig. 5 is an end elevation of the gate, being a view taken as indicated by line 5—5 on Fig. 3. Fig. 6 is a detailed sectional view of the gate, being a view taken as indicated by line 6—6 on Fig. 3, and Fig. 7 is a sectional view taken as indicated by line 7—7 on Fig. 3.

The motion picture apparatus illustrated in the drawings for the purpose of showing an application of the present invention is in the nature of a camera operable to take pictures on a continuously moving film, this particular camera being the subject of my co-pending application above identified. The optical system of the camera includes, generally, a mat box 10, an objective lens 11 behind the gate box, a revolving series of lens elements 12 operating across the axis of the optical system at a single point behind the objective lenses, and a corrective lens 13 located between the film and the point in the optical system through which the lens elements 12 operate. The mat box 10 projects forward from the objective lens and carries a mat which operates to determine the frame or size of pictures obtained on the film. The objective lens 11 may be of the general type ordinarily employed in cameras and, in practice, may be mounted and adjusted in the manner common to objective lenses. The lens elements 12 are carried by a revolving lens carrier 14 and are arranged to project axially from the periphery of the lens carrier so that they are in the nature of an annular series of lenses. The lens carrier 14 is mounted in the body 15 of the camera so that the lens elements 12 pass through the optical system at a definite point along the axis of the system. The lens elements, in moving through or across the axis of the optical system, deflect the light passed by the objective lens and cause the images that fall on the film F to move or shift in synchronism with the movement of the film. The corrective lens 13 is mounted in a definite position between the film F and the point in the optical system through which the lens elements 12 move, and is designed to correct enlargement and distortions caused by the lens elements 12.

The film F is guided through or across the axis of the optical system at the desired point through the film gate or guide provided by this invention, the guide being carried by a partition-like part 16 of the body 15 which projects into the annular series of the lens elements 12. The film F is operated through the guide by drive sprockets 18 located at the ends of the guide. The drive sprockets are mounted on shafts 19 carried by the partition part 16 of the body. A pinion 20 is fixed to the lens carrier 14 to revolve therewith. Gears 21 are fixed on the sprocket shafts 19 to mesh with the pinion 20 so that the sprockets are operated in synchronism with the lens carrier and in a manner to give the film the desired speed with reference to the movement of the lens elements 12 across the axis of the optical system.

The film guide provided by the present invention includes, generally, a base plate 22 carried by the partition part 16 of the body 15, a film guiding plate 23 arranged at the rear of the base plate, means 24 connecting the film guiding plate with the base plate, means 25 for adjusting the position of the film guiding plate with reference to the base plate, and a gate 26 co-operating with the film guiding plate in holding the film F. The base plate 22 is carried by the partition part 16 of the body 15 so that it is within the series of lens elements 12 in position to intersect the axis of the optical system. An aperture 27 is formed through the base plate 22 in line with the optical system. The base plate 22 is detachable from the part 16, making the film gate detachable as a unit from the other parts of the camera. In the particular construction illustrated, the upper and lower edges of the base plate are parallel and are formed with ribs 29. The upper and lower edges of the base plate, with their ribs 29, slidably fit an opening 30 formed in the partition part 16 for the reception of the gate. Through this mounting of the gate in the partition, the gate is held at its upper and lower edges and throughout its length, making it firm and accurate when in position, as shown throughout the drawings. The base plate may be held in position in the opening of the partition part 16 by suitable means, say, for instance, a set screw.

The front face of the base plate is provided with a longitudinal or horizontal guideway 31 that slidably carries a viewing device that includes a reflector 32 and a ground glass 33. The device just mentioned is supported by the guideway 31 so that it is shiftable into and out of position where the reflector 32 intercepts the light passing through the optical system to reflect it off after it has passed the corrective lens 13, so that it falls on the ground glass 33 instead of the film F. This device is more fully set forth, and is claimed, in my co-pending application entitled Viewing and focus finding device for cameras, filed April 18, 1931, Serial Number 531,201. The reflector 32 and the ground glass 33 are carried by a common frame or slide 35 carried by the guideway 31 so that they are detachable from the other parts of the camera with the film gate.

A vertical guideway 36 is provided at the front face of the base plate at the aperture 27 to carry light regulating shutters 38. The shutters 38 are carried by the guideway 36 so that they extend transversely of the aperture 27 and are shiftable vertically to vary the vertical extent of the opening admitting light to the film F. There are two shutters 38 that can be moved in opposite directions in order to vary the vertical extent of the light passage. This light control is more fully set forth, and is claimed, in my co-pending application entitled Light control for cameras, filed April 18, 1931, Serial Number 531,202.

The film-guiding plate 23 is arranged at the rear of the base plate and has an aperture 39 in line with the aperture 27 in the base plate. The rear face of the film-guiding plate is provided with a film-guiding channel 40 for guiding the film F vertically past the aperture 39.

The means 24 for connecting the film guiding plate 23 with the base plate 22 may include a plurality of lugs or projections 41 extending from the forward face of the film-guiding plate 23 through openings 42 in the base plate. Heads 43 are provided on the lugs 41 at the front of the base plate. In accordance with the present invention, the film-guiding plate is normally urged forward or toward the base plate. In the form of the invention illustrated, helical springs 44 are arranged under compression between the heads 43 on the lugs 41 and the base plate so that the lugs are normally urged forward and therefore cause the film-guiding plate to be urged forward. The construction just referred to is clearly illustrated in Fig. 6 of the drawings.

The means 25, provided for adjusting the position of the film-guiding plate with reference to the base plate, permits the film-guiding plate to be set in the desired position longitudinally of the axis of the optical system. The means 25 may include one or more parts operating to hold the film-guiding plate away from the base plate, the parts being capable of adjustment or regulation to vary the spacing of the film-guiding plate with reference to the base plate.

In the construction illustrated, the parts which operate to hold the film-guiding plate in the desired spaced relation to the base plate are in the nature of eccentrics or cam parts 46. In the preferred construction, cam shafts 47 are rotatably carried by one of the plates of the gate, for instance, in bearing grooves 48 formed in one of the plates, and the cam parts 46 are fixed on the shafts so that they hold the film-guiding plate away from the base plate and are adjustable to vary the spacing of the film-guiding plate from the base plate. In the construction illustrated, the bearing grooves 48 which support the shafts 47 are formed in the rear face of the base plate and are located so that the cams effectively support the film-guiding plate. By providing the construction with two shafts 47 and providing two cams on each shaft, the four corners of the film-guiding plate are supported by the cams. The shafts 47 are carried in the bearing grooves 48 so that they can be rotated to adjust or vary the positioning of the cams.

Set screws 50, or the like, may be provided to engage the shafts to set them in the desired positions. In the construction illustrated, set screws 50 are shown carried by the base plate so that their heads may be tightened against the shafts to set the shafts against turning. In order to provide a compact construction, the bearing grooves 48 are preferably formed deep in the rear face of the base plate, and the cams 47, which are in the nature of eccentric parts fixed on the shafts, operate in suitable openings 51 in the base plate and project from the rear face of the base plate to engage the forward face of the film-guiding plate. In practice, the springs 44 are made so that they normally urge the film-guiding plate forward or toward the base plate with sufficient force to maintain the film-guiding plate in bearing engagement with the cam parts 46.

The gate 26 is arranged at the rear of the film-guiding plate and co-operates with the film-guiding plate in holding the film F in the desired position. In the construction illustrated, the gate has one edge pivotally connected with the film-guiding plate through a pivot pin 60, so that it can be swung into and out of position where it holds the film in the channel 40. Suitable means may be provided for holding the gate in the closed or operating position, for instance, a thumb screw 61, or the like, may be threaded to the film-guiding plate to engage the other edge portion of the gate, as shown throughout the drawings. In the construction illustrated, the forward face 62 of the gate is flat and smooth and operates to retain the film F in the film-guiding channel provided in the rear face of the film-guiding plate 23.

From the foregoing description, it will be obvious that the film gate or guiding device is in the nature of a unit detachably mounted in the body of the camera. The film guide is not only detachable from the other parts of the camera, but is adjusted longitudinally of the axis of the optical system without interfering with the action of the film-operating means. It is to be noted that the film-operating means or sprockets 18 are separated from the film guide proper, allowing the film-guiding plate 23 and the gate 26 to be moved as a unit longitudinally of the optical system independently of the film-operating means. Through this construction, the gate or film-guiding mechanism is simple in construction, mounting, and operation, and the general construction and arrangement of parts throughout the mechanism is simple and free of complicated mountings and drives, etc.

Having described only a typical, preferred form of my invention, I do not wish to limit myself to the specific details set forth, but wish to reserve to myself any changes or variations that may appear to those skilled in the art or fall within the scope of the following claims.

Having described my invention, I claim:

1. In motion picture apparatus, an optical system, a film guide located to guide a film across the axis of the optical system, and means for adjusting the position of the film guide longitudinally of the optical system, said means including means normally urging the guide in one direction longitudinally of the axis of the optical system, and adjustable stops spaced from the last mentioned means holding the guide against movement in said direction.

2. In motion picture apparatus, an optical system, a film guide located to guide a film across the axis of the optical system, and means for adjusting the position of the film guide longitudinally of the optical system, said means including spring means normally urging the guide in one direction longitudinally of the axis of the optical system, and adjustable cam stops spaced from the spring means for holding the guide against movement in said direction.

3. In motion picture apparatus, an optical system, a film guide located to guide a film across the axis of the optical system, and means for adjusting the position of the film guide longitudinally of the optical system, said means including means normally urging the guide in one direction longitudinally of the axis of the optical system, and a plurality of adjustable stops spaced from the last mentioned means for holding the guide against movement in said direction.

4. In motion picture apparatus, an optical system, a base plate having a light passing aperture registering with the optical system, a film guiding plate substantially parallel to and carried by the base plate to guide film across the axis of the optical system, and cam means cooperating with the guide plate at spaced points for adjusting the guide plate relative to the base plate longitudinally of the axis of the optical system.

5. In motion picture apparatus, an optical system, a base plate having a light passing aperture coaxial with the axis of the optical system, a film guiding plate carried by and substantially parallel to the base plate to guide film across the axis of the optical system, and means for adjusting the guide plate relative to the base plate longitudinally of the axis of the optical system, said means including a shaft carried by one of the plates, and a cam on the shaft engaging the other plate.

6. In motion picture apparatus, an optical system, a base plate having a light passing aperture coaxial with the axis of the optical system, a film guiding plate carried by and substantially parallel to the base plate to guide film across the axis of the optical system, and means for adjusting the guide plate relative to the base plate longitudinally of the axis of the optical system, said means including a spring normally urging the plates together, a shaft carried by one of the plates, and a cam on the shaft engaging the other plate to hold the plates apart.

7. In motion picture apparatus, an optical system, a base plate having a light passing aperture coaxial with the axis of the optical system, a film guiding plate carried by and substantially parallel to the base plate to guide film across the axis of the optical system, a gate in connection with the guide for co-operating with the guide in holding film, and means for adjusting the guide plate relative to the base plate longitudinally of the axis of the optical system, said means including a spring urging the plates together, a cam carried by one plate and engaging the other plate to hold the plates apart, and releasable means for locking the cam against movement.

8. In motion picture apparatus, a case, an optical system carried by the case, a base plate, means detachably mounting the base plate stationary in the case, the base plate having a light passing aperture registering with the optical system, a light regulating means carried by the plate in front of the aperture, a film guide carried by the plate at the rear of the aperture, and means for adjusting the guide relative to the plate longitudinally of the optical system.

GABRIEL GARCIA MORENO.